United States Patent
Lin et al.

(10) Patent No.: US 11,054,947 B2
(45) Date of Patent: Jul. 6, 2021

(54) KEY REFERENCE UPDATING METHOD AND MODULE, AND TERMINAL DEVICE

(71) Applicant: SHENZHEN GOODIX TECHOLOGY CO., LTD., Guangdong (CN)

(72) Inventors: Jinhui Lin, Guangdong (CN); Dan Wu, Guangdong (CN); Yunfang Long, Guangdong (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 446 days.

(21) Appl. No.: 16/159,172

(22) Filed: Oct. 12, 2018

(65) Prior Publication Data

US 2019/0065720 A1 Feb. 28, 2019

Related U.S. Application Data

(63) Continuation of application No. PCT/CN2016/107167, filed on Nov. 24, 2016.

(51) Int. Cl.
*G06F 3/044* (2006.01)
*G06F 21/32* (2013.01)
*G06F 3/023* (2006.01)
*G06K 9/00* (2006.01)
*H03K 17/96* (2006.01)

(52) U.S. Cl.
CPC .............. *G06F 3/044* (2013.01); *G06F 3/023* (2013.01); *G06F 21/32* (2013.01); *G06K 9/0002* (2013.01);
(Continued)

(58) Field of Classification Search
CPC ........................................................ G06F 3/044
See application file for complete search history.

(56) References Cited

U.S. PATENT DOCUMENTS

| 2002/0017136 A1* | 2/2002 | Morimura ............ G06K 9/0002 73/514.32 |
| 2005/0073324 A1* | 4/2005 | Umeda ................ G11C 27/026 324/662 |

(Continued)

FOREIGN PATENT DOCUMENTS

| CN | 101419522 A | 4/2009 |
| CN | 101799734 A | 8/2010 |

(Continued)

OTHER PUBLICATIONS

Extended European Search Report for European Application No. 16922211.4 dated Apr. 12, 2019.
(Continued)

*Primary Examiner* — Ponnoreay Pich
(74) *Attorney, Agent, or Firm* — Heslin Rothenberg Farley & Mesiti P.C.

(57) ABSTRACT

In keystroke recognition technologies, a method and a module for updating a keystroke reference, and a terminal device are provided. The method for updating a keystroke reference includes: receiving a pressing interrupt sent by a keystroke chip; obtaining a plurality of pressing capacitance values from the keystroke chip, where the plurality of pressing capacitance values include a capacitance value of the keystroke chip at a generation moment of the pressing interrupt and a capacitance value of the keystroke chip at a scanning moment next to the generation moment of the pressing interrupt; and setting a release reference of the keystroke chip according to the plurality of pressing capacitance values, to improve interchangeability and anti-interference of the keystroke chip with no extra burden on a main control chip.

18 Claims, 7 Drawing Sheets

(52) U.S. Cl.
 CPC . *H03K 17/962* (2013.01); *H03K 2217/94026* (2013.01)

(56) References Cited

U.S. PATENT DOCUMENTS

| | | | |
|---|---|---|---|
| 2007/0042767 A1* | 2/2007 | Stepanian | G06F 1/1698 |
| | | | 455/420 |
| 2007/0186663 A1* | 8/2007 | Chang | H03K 17/962 |
| | | | 73/774 |
| 2010/0097355 A1 | 4/2010 | Jang et al. | |
| 2010/0207890 A1 | 8/2010 | Chen | |
| 2011/0156800 A1* | 6/2011 | Lee | H03K 17/96 |
| | | | 327/517 |
| 2016/0349898 A1* | 12/2016 | Lai | G06F 3/041661 |
| 2017/0346488 A1* | 11/2017 | Minezaki | G06F 3/0202 |
| 2019/0065720 A1* | 2/2019 | Lin | G06F 3/044 |

FOREIGN PATENT DOCUMENTS

| | | |
|---|---|---|
| CN | 102622173 A | 8/2012 |
| CN | 102968217 A | 3/2013 |
| CN | 105556443 A | 5/2016 |

OTHER PUBLICATIONS

MWC2016, DOI:10.13571/j.cnki.cwww.2016.05.021, China Academic Journal Electronic Publishing House, http://www.cnki.net, p. 39 (and English translation of abstract).

\* cited by examiner

KEY REFERENCE UPDATING METHOD AND MODULE, AND TERMINAL DEVICE

CROSS REFERENCE TO RELATED APPLICATIONS

This disclosure is a continuation of international application No. PCT/CN2016/107167, filed on Nov. 24, 2016, which is hereby incorporated into this disclosure by reference in its entirety.

FIELD

Embodiments of the present disclosure relate to keystroke recognition technologies, and in particular, to a method and a module for updating a keystroke reference, and a terminal device.

BACKGROUND

A fingerprint recognition technology is a standard configuration for current smartphones, and many vendors provide a fingerprint module with additional functions such as single-click to return, double-click to pop out a background application, left-right to switch a task, up-down to pop out a taskbar. With development of fingerprint chips, a fingerprint chip without a micro controller unit ("MCU") becomes popular. An existing method for updating a keystroke reference in real time by a fingerprint chip with an MCU cannot be applied to a fingerprint chip without an MCU.

Currently, whether a fingerprint key is pressed or loosened is usually determined according to an absolute threshold. As shown in FIG. 1, a key pressing state of a fingerprint key is usually determined by using an absolute reference value 101 and a threshold 102, where the threshold 102 is a difference value. In a process in which a finger presses the fingerprint key, a key capacitance value changes as the finger presses. If a difference value between the reference value 101 and a current key capacitance value is greater than the threshold 102, it is determined that the fingerprint key is in a key pressing state 105 in this case. In a process in which the finger loosens upward, if a difference value between the reference value 101 and a current key capacitance value is less than the threshold 102, the fingerprint key is in a key loosening state 106.

However, the above approach of determining a pressing state of the fingerprint key according to the absolute threshold has at least the following problems:

(1) interchangeability of the above approach is poor, as reference values of different fingerprint modules can be different;

(2) the above approach can be relatively affected by the ambient temperature and an external environment; and (3) anti-interference can be relatively weak.

SUMMARY

An objective of embodiments of the present disclosure is to provide a method and a module for updating a keystroke reference, and a terminal device, with improved interchangeability and anti-interference of a keystroke chip and without extra burden on a main control chip.

To solve the above technical problem, an embodiment of the present disclosure provides a method for updating a keystroke reference. The method includes the following steps: receiving a pressing interrupt sent by a keystroke chip; obtaining a plurality of pressing capacitance values from the keystroke chip, where the plurality of pressing capacitance values include a capacitance value of the keystroke chip at a generation moment of the pressing interrupt and a capacitance value of the keystroke chip at a scanning moment next to the generation moment of the pressing interrupt; and setting a release reference of the keystroke chip according to the plurality of pressing capacitance values.

An embodiment of the present disclosure further provides a module for updating a keystroke reference, including: a main control chip and a keystroke apparatus including a keystroke chip. The keystroke chip is configured to generate a pressing interrupt and send the pressing interrupt to the main control chip when a finger presses the keystroke apparatus; the main control chip is configured to receive the pressing interrupt, and obtain a plurality of pressing capacitance values from the keystroke chip, where the plurality of pressing capacitance values include a capacitance value of the keystroke chip at a generation moment of the pressing interrupt and a capacitance value of the keystroke chip at a scanning moment next to the generation moment of the pressing interrupt; and the main control chip is further configured to set a release reference of the keystroke chip according to the plurality of pressing capacitance values.

An embodiment of the present disclosure further provides a terminal device, including: a module for updating a keystroke reference that includes a main control chip and a keystroke apparatus including a keystroke chip.

Compared with existing technologies, in the embodiments of the present disclosure, after a pressing interrupt is received, a plurality of pressing capacitance values after the pressing interrupt can be obtained. A new release reference of a keystroke chip is set according to one of the plurality of pressing capacitance values. Consequently, each of different keystroke chips can set a release reference for a next stage according to the capacitance values obtained from a current pressing. Therefore, this can be applied to different keystroke chips, and high consistency in various parameters of different keystroke chips is not required, and interchangeability is high. Each time after a pressing interrupt occurs, a release reference is dynamically updated and the release reference is set according to a current state, which allows the release reference at a moment to be consistent with an external environment. Therefore, interference from an external environment can be reduced and anti-interference is stronger. Moreover, only after an interrupt occurs, a reference is updated. Such an update is performed during a time gap at a terminal device, and can avoid wasting resources of a main control chip.

Additionally, a release interrupt sent by the keystroke chip is received; a plurality of release capacitance values is obtained from the keystroke chip, where the plurality of release capacitance values includes a capacitance value of the keystroke chip at a generation moment of the release interrupt and a capacitance value of the keystroke chip at a scanning moment next to the generation moment of the release interrupt; and a pressing reference of the keystroke chip is set according to the plurality of release capacitance values. In this embodiment, for a pressing process and a release process, as the pressing reference and the release reference are respectively set for the keystroke chip, and the keystroke chip thus has different references for determining a pressing and a release, determination can be more accurate. The pressing reference and the release reference are updated in a similar manner, which further improves anti-interference of a keystroke chip, and prevents the keystroke chip from being susceptible to an external environment.

Additionally, setting a release reference of a keystroke chip according to the plurality of pressing capacitance values specifically includes: setting a pressing capacitance value that meets a first preset condition from the plurality of pressing capacitance values as the release reference of the keystroke chip. Setting a pressing reference of the keystroke chip according to the plurality of release capacitance values specifically includes: setting a release capacitance value that meets a second preset condition from the plurality of release capacitance value as the pressing reference of the keystroke chip. This embodiment provides an example of setting the release reference and the pressing reference.

Additionally, the first preset condition is a smallest pressing capacitance value of the plurality of pressing capacitance values, and the second preset condition is a largest release capacitance value of the plurality of release capacitance values. Alternatively, the first preset condition is a largest pressing capacitance value of the plurality of pressing capacitance values, and the second preset condition is a smallest release capacitance value of the plurality of release capacitance values. This embodiment provides two different examples for setting the first preset condition and the second preset condition.

Additionally, the method for updating a keystroke reference further includes: receiving a pressing reference error interrupt sent by the keystroke chip; obtaining a normal capacitance value from the keystroke chip, where the normal capacitance value is a capacitance value of the keystroke chip when not pressed; and setting the pressing reference according to the normal capacitance value. When the pressing reference has an error, the keystroke chip may automatically report the error.

BRIEF DESCRIPTION OF THE DRAWING FIGURES

One or more embodiments are exemplarily described by using pictures in accompanying drawings corresponding to the embodiments, these exemplary descriptions do not constitute any limitation on the embodiments, and elements with the same reference numerals in the accompanying drawings indicate similar elements. Unless stated otherwise, the figures in the accompanying drawings do not constitute any proportional limitation.

DETAILED DESCRIPTION

To make objectives, technical solutions, and advantages of embodiments of the present disclosure more comprehensible, the following describes embodiments of the present disclosure in details with reference to the accompanying drawings. However, a person of ordinary skill in the art can understand that to make readers better understand this application, many technical details are put forward in the embodiments of the present disclosure. However, even without these technical details and various changes and modifications to the following embodiments, technical solutions that are claimed in this application for protection may still be achieved.

Figure 1:
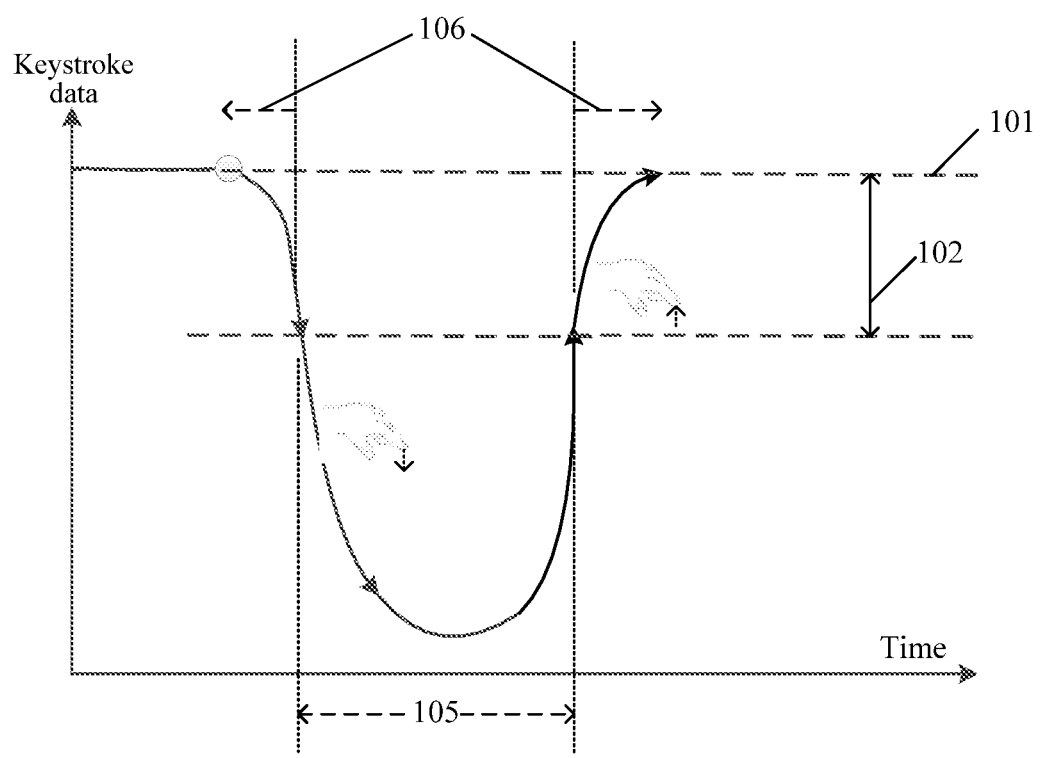
FIG. 1 is a schematic diagram of an existing process of determining a key pressing state based on an absolute threshold according to the present disclosure.
Figure 2:
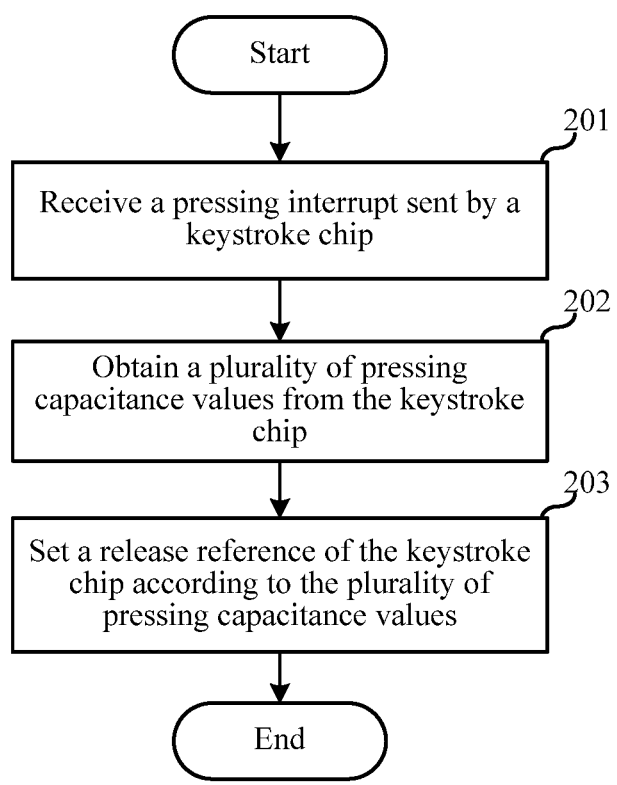
FIG. 2 is a flowchart of a keystroke reference update method according to a first embodiment of the present disclosure.

A first embodiment of the present disclosure relates to a keystroke reference update method. A specific process is shown in FIG. 2, and includes the following steps.

Step 201: Receive a pressing interrupt sent by a keystroke chip.

Specifically, when a key is pressed to an extent, the keystroke chip generates a pressing interrupt, and sends the generated pressing interrupt to a main control chip. The key may be a fingerprint key, where the pressing interrupt is generated by the keystroke chip according to a pressing reference and a pressing threshold. The pressing reference is a capacitance value of the keystroke chip when the key is in a state of being not pressed, and indicates capacitance characteristic values of different keystroke chips.

Further, the pressing reference is known before a current key pressing operation. Moreover, in each key pressing operation process, a corresponding pressing reference may be different, and therefore, the pressing reference may be updated. A pressing capacitance value is a capacitance value of the keystroke chip in a finger pressing process. When the key is not pressed by a finger or another object and in a case where the pressing capacitance value gradually decreases with the key being pressed, the pressing reference is a largest capacitance value of the keystroke chip.

In this embodiment, the pressing threshold can be understood as a threshold that is set according to a difference value between the pressing capacitance value and the pressing reference. The pressing threshold may be preset, and may be ⅓ of a change amount of the capacitance value of the keystroke chip after the finger stably presses. Alternatively, because the capacitance characteristic values of different keystroke chips are different, the pressing threshold may be ½ of the change amount of the capacitance value of the keystroke chip after the finger stably presses. After the pressing reference prior to the current pressing and the set pressing threshold are known, the obtained pressing capacitance value gradually decreases in the key pressing process. If the difference value between the current pressing capacitance value and the pressing reference reaches the pressing threshold, a pressing interrupt is generated, and the keystroke chip sends the pressing interrupt.

In practice, if the key is not triggered for a period of time, the main control chip is in a sleep state before receiving an interrupt. After receiving a key interrupt sent by the keystroke chip, the main control chip is awakened to enter an operating state and then enters step 202. On the contrary, if the main control chip is in the operating state before receiving an interrupt, the main control chip directly enters step 202.

Step 202: Obtain a plurality of pressing capacitance values from the keystroke chip.

Specifically, the plurality of pressing capacitance values include a capacitance value of the keystroke chip at a generation moment of the pressing interrupt and a capacitance value of the keystroke chip at a scanning moment next to the generation moment of the pressing interrupt, where the obtained capacitance value at the scanning moment is less than the capacitance value obtained at the generation moment of the pressing interrupt. After the pressing interrupt is triggered, the finger has not completely pressed. As the finger continues to press, the capacitance value of the key may further gradually decrease, a capacitance value at a next moment after an interrupt occurs needs to be obtained, and a smaller pressing capacitance value is obtained by comparing the two capacitance values.

It should be noted that, the keystroke chip may also scan the keystroke chip itself once every period of time, to obtain a plurality of capacitance values of the keystroke chip That is, the keystroke chip may obtain the plurality of capacitance values of the keystroke chip at a plurality of time points (i.e. scanning moments), and the capacitance values are stored in the keystroke chip. By communication with the keystroke chip, the main control chip can obtain the capacitance values at the plurality of scanning moments that are stored in the keystroke chip. The main control chip can respectively obtain the pressing capacitance values at the plurality of scanning moments by accessing the keystroke chip many times. Moreover, by accessing the keystroke chip one time the main control chip can also simultaneously obtain the pressing capacitance values at the plurality of scanning moments that are stored in the keystroke chip.

Step 203: Set a release reference of the keystroke chip according to the plurality of pressing capacitance values.

Specifically, a smaller pressing capacitance value is selected from the plurality of pressing capacitance values obtained in step 202. The smaller pressing capacitance value is set as the release reference of the keystroke chip. The smaller pressing capacitance value is used as a basis for determining a key pressing state when the finger lifts up.

Figure 3:
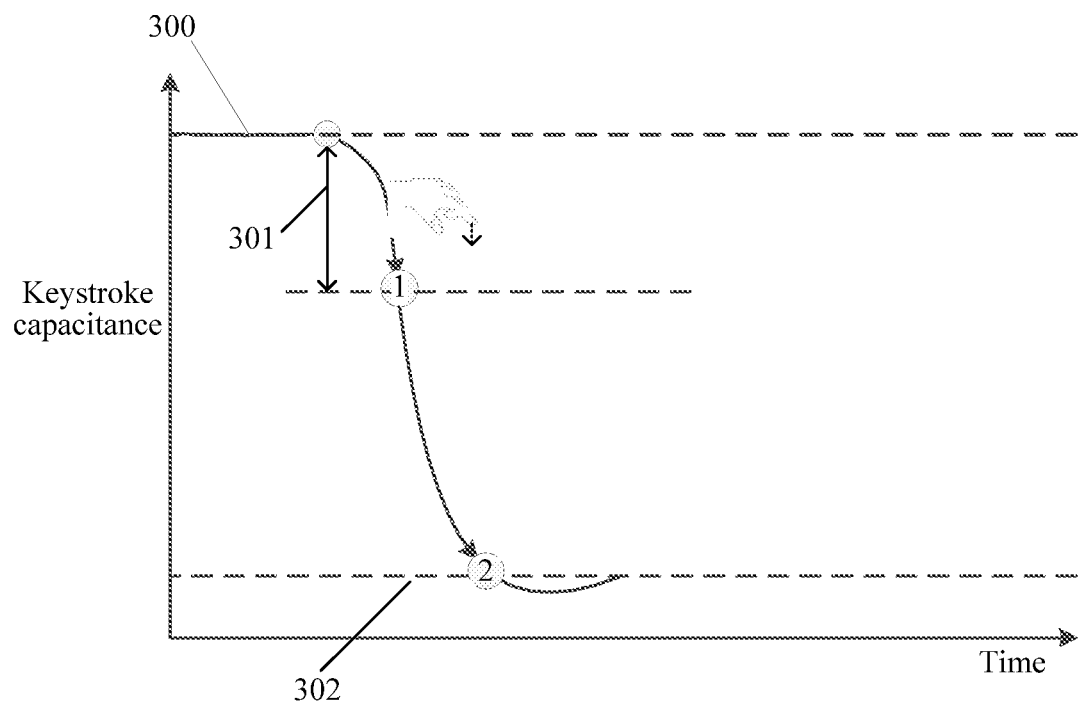
FIG. 3 is a schematic diagram of a key pressing process according to a first embodiment of the present disclosure.

A process where a finger gradually presses a key is specifically described below, and a schematic diagram of the process is shown in FIG. 3.

When no finger presses, the pressing reference is at a largest value 300. When a change amount of pressing of the finger exceeds a preset pressing threshold 301, the keystroke chip sends a pressing interrupt (that is, "1" marked in the figure). Subsequently, the finger continues to press. In a process where the finger continues to press (that is, a process between "1" and "2" marked in the figure), a plurality of capacitance values may be obtained at a plurality of scanning moments, and a smaller pressing capacitance value (that is, "2" marked in the figure) of the capacitance values is selected as the release reference 302 of the keystroke chip.

A main improvement and effect of this embodiment of the present disclosure are described. After a pressing interrupt is received, a plurality of pressing capacitance values after the pressing interrupt are obtained. A new release reference of the keystroke chip is set according to one of the plurality of pressing capacitance values, and different keystroke chips can set release references for a next stage according to the capacitance values obtained from the current pressing. Therefore, this can be applied to the different keystroke chips, and high consistency in various parameters of different keystroke chips is not required, and interchangeability is high. Each time after a pressing interrupt occurs, the release reference is dynamically updated, and the release reference is set according to a current state, which allows the release reference at a moment to be consistent with an external environment. Therefore, interference from the external environment can be reduced, and anti-interference is stronger. Moreover, in this embodiment, after the main control chip is awakened due to the pressing interrupt (a conventional interrupt function), the keystroke reference is updated by fully using a data margin of the main control chip, and thus there is no additional burden on the main control chip.

Figure 4:
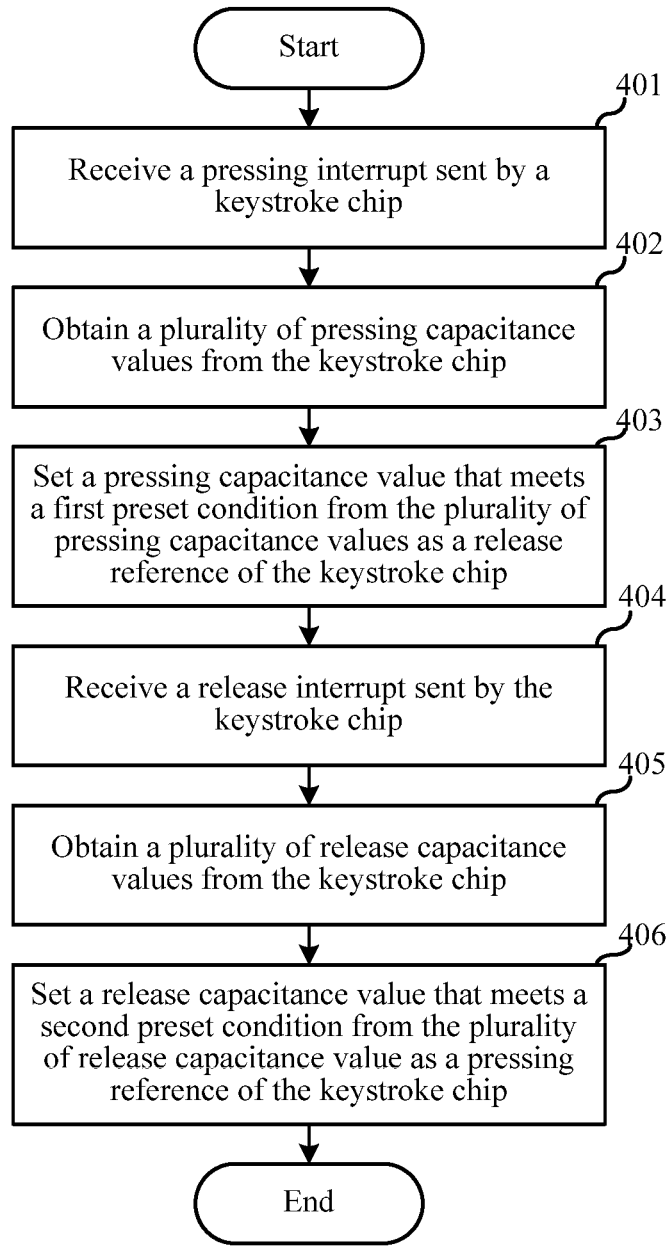
FIG. 4 is a flowchart of a keystroke reference update method according to a second embodiment of the present disclosure.

A second embodiment of the present disclosure relates to a method for updating a keystroke reference. A specific process is shown in FIG. 4.

Step 401: Receive a pressing interrupt sent by a keystroke chip. Step 402: Obtain a plurality of pressing capacitance values from the keystroke chip.

Steps 401 and 402 are the same with steps 201 and 202. More details can be referred to the description of the above embodiments.

Step 403: Set a pressing capacitance value that meets a first preset condition from the plurality of pressing capacitance values as a release reference of the keystroke chip.

Specifically, in this embodiment, the first preset condition is a smaller capacitance value of the plurality of capacitance values. The plurality of pressing capacitance values obtained in step 402 are sequentially compared and determined. For example, a capacitance value obtained at an interrupt generation moment may be used as an initial capacitance value, a pressing capacitance value obtained at a next moment is compared with the initial capacitance value, and a smaller capacitance value is recorded. Moreover, before the comparison is performed, a count value that is initially zero is preset, and a quantity of comparison times is recorded. After the comparison is completed each time, the count value is automatically increased by one, until the count value is equal to a quantity of pressing capacitance values minus one. In this case, the obtained capacitance value is a pressing capacitance value that meets the first preset condition from the plurality of pressing capacitance values and, that is, a smaller pressing capacitance value of the plurality of pressing capacitance values, and the pressing capacitance value meeting the first preset condition is set as the release reference of the keystroke chip.

It should be noted that, the first preset condition may also be a larger capacitance value of the plurality of capacitance values, and a method for determining the larger capacitance value is the same with that described above.

Step 404: Receive a release interrupt sent by the keystroke chip.

Specifically, after completing the key pressing, the finger needs to release the key. When the key is released to a position, the keystroke chip generates a release interrupt and sends the generated release interrupt to the main control chip. The release interrupt is generated by the keystroke chip according to the release reference and a release threshold. That is, when the finger releases the key to a position, a release capacitance value of the keystroke chip is obtained. If a difference value between the release capacitance value and the release reference exceeds the release threshold, the release interrupt is triggered. The release capacitance value is a capacitance value of the keystroke chip in a finger release process.

Step 405: Obtain a plurality of release capacitance values from the keystroke chip.

Specifically, the plurality of release capacitance values include a capacitance value of the keystroke chip at a generation moment of the release interrupt and a capacitance value of the keystroke chip at a scanning moment next to the generation moment of the release interrupt. As the finger continues to release, the obtained capacitance value of the scanning moment is greater than the capacitance value obtained at the generation moment of the release interrupt.

It should be noted that, the keystroke chip may also be scanned once every period of time, to obtain a plurality of capacitance values of the keystroke chip. That is, the plurality of capacitance values of the keystroke chip may be obtained respectively at a plurality of time points (i.e. scanning moments). The main control chip obtains the capacitance values at the plurality of scanning moments, and can respectively obtain the capacitance values at the plurality of scanning moments by accessing the keystroke chip many times. Moreover, by accessing the keystroke chip one time, the main control chip can also simultaneously obtain the pressing capacitance values at the plurality of scanning moments.

Step 406: Set a release capacitance value that meets a second preset condition from the plurality of release capacitance value as a pressing reference of the keystroke chip.

Specifically, if the first preset condition is a smaller capacitance value of the plurality of capacitance values in step 403, the second preset condition is a larger capacitance value of the plurality of capacitance values in this step. A comparison method in this step is similar to a comparison method in step 403. In this step, two capacitance values are compared, and a larger capacitance value is recorded, and is set as the pressing reference of the keystroke chip.

It should be noted that, if the first preset condition is a smaller capacitance value of the plurality of capacitance values in step 403, the second preset condition is correspondingly a larger capacitance value of the plurality of capacitance values in this step.

It should be noted that, strict logical precedence relationship between steps 401 to 403 and steps 404 to 406 are not necessary. For example, operations in steps 401 to 403 may be first performed, or operations in steps 404 to 406 may be first performed. Any sequence of performing the steps does not affect the result.

Figure 5:
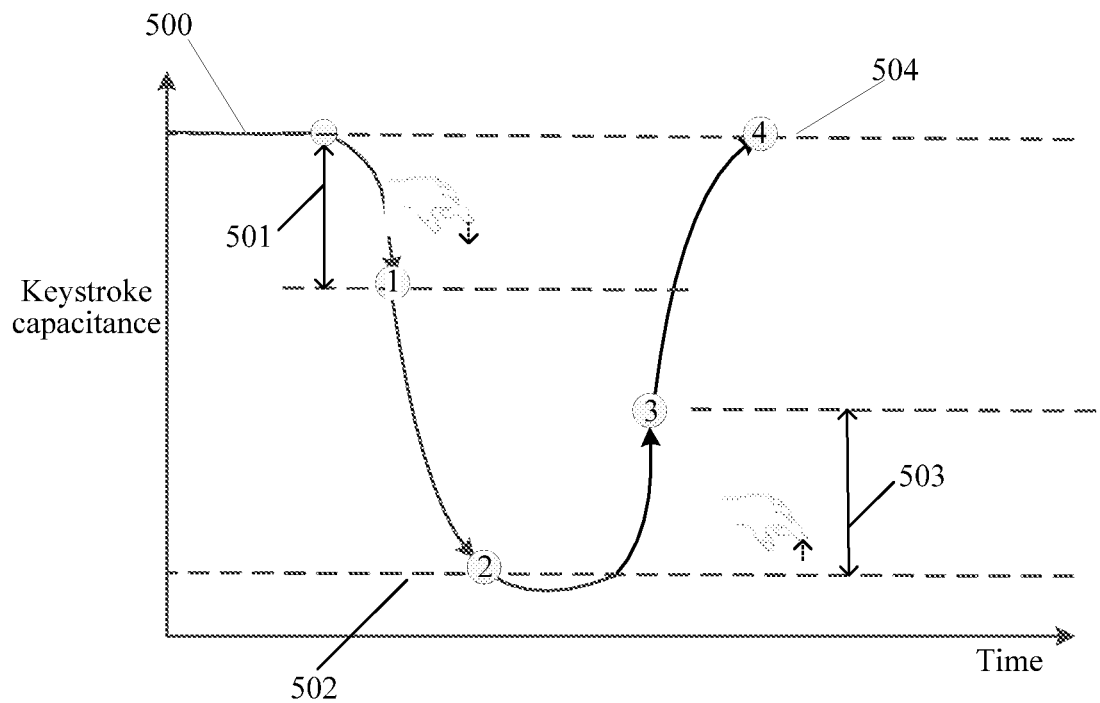
FIG. 5 is a schematic diagram of a process of pressing and loosening a key in a case where a capacitance value decreases as the key is pressed according to a second embodiment of the present disclosure.

A process of pressing and loosening a key without external interference factors is specifically described below, and a schematic diagram of the process is shown in FIG. 5.

When no finger presses, the pressing reference is at a largest value 500, and a pressing threshold 501 and a release threshold 503 are preset. When a difference value between the pressing reference and a pressing capacitance value exceeds the pressing threshold 501 after a finger presses, the keystroke chip sends a pressing interrupt (that is, "1" marked in the figure). Subsequently, the finger continues to press, and when the finger completely presses (that is, "2" marked in the figure), a smallest pressing capacitance value obtained in this pressing process is used as a release reference 502. After the finger gradually leaves the keystroke chip, the capacitance value of the keystroke chip gradually increases. In the finger release process, when a difference value between a detected release capacitance value and the release reference 502 is equal to or greater than the release threshold 503, a release interrupt (that is, "3" marked in the figure) is triggered, and the keystroke chip sends the release interrupt to the main control chip. The finger continues to loosen the key (that is, release the key), and when the key is approximately in a normal state (that is, "4" marked in the figure), a largest release capacitance value of the keystroke chip obtained in this release process is used as a pressing reference 504. After the finger completely leaves the key, the reference value of the key returns to a highest point again. The highest point 504 may be different from the largest pressing reference value 500.

Moreover, it should be noted that, the release reference 502 is basically consistent with a reference value obtained when the finger completely presses. Because the obtained plurality of pressing capacitance values is obtained at different scanning moments, and a time interval exists between every two scanning moments, the scanning moment may be not a moment when the pressing capacitance value is actually lowest. Therefore, as only a smaller capacitance value of the plurality of capacitance values needs to be obtained, the capacitance value is closest to a capacitance value of the keystroke chip when the finger completely presses, and it can be considered that the two capacitance values are consistent.

Figure 6:
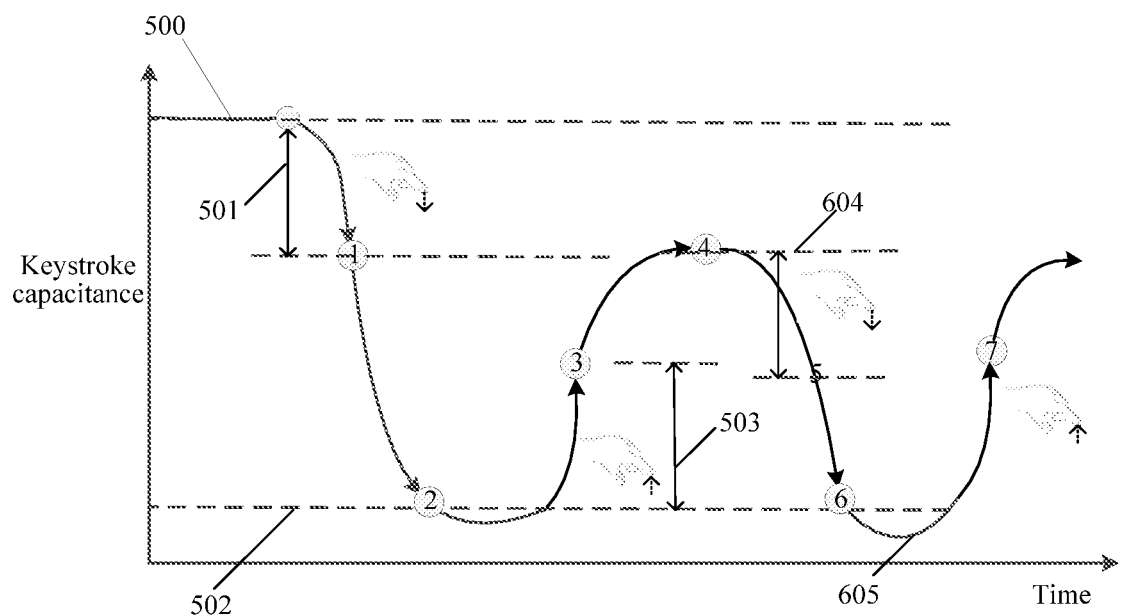
FIG. 6 is a schematic diagram of a process of pressing and loosening a key in a case where a capacitance value increases as the key is pressed and when an external environment changes according to a second embodiment of the present disclosure.

When an external environment changes, FIG. 6 is a schematic diagram of a process of pressing and loosening a key.

When the external environment changes (that is, "4" marked in the figure), for example, residual water or sweat is on the key, the pressing reference of the key cannot return to a highest point. If a conventional absolute reference method is used, it may be determined that the key cannot be loosened. In a dynamic reference method provided in this embodiment, a release reference different from the pressing reference is set, and if a user performs pressing that exceeds a pressing threshold 501 of the keystroke chip, a pressing interrupt (that is, "5" marked in the figure) of the key may be triggered likewise, and then a process that is the same as the previous key pressing is repeated. When the finger is away from the key, the capacitance value of the keystroke chip gradually increases from a bottom 605. When an increase amount of the capacitance value reaches a release threshold 503, a release interrupt (that is, "7" marked in the figure) can be triggered.

Figure 7:
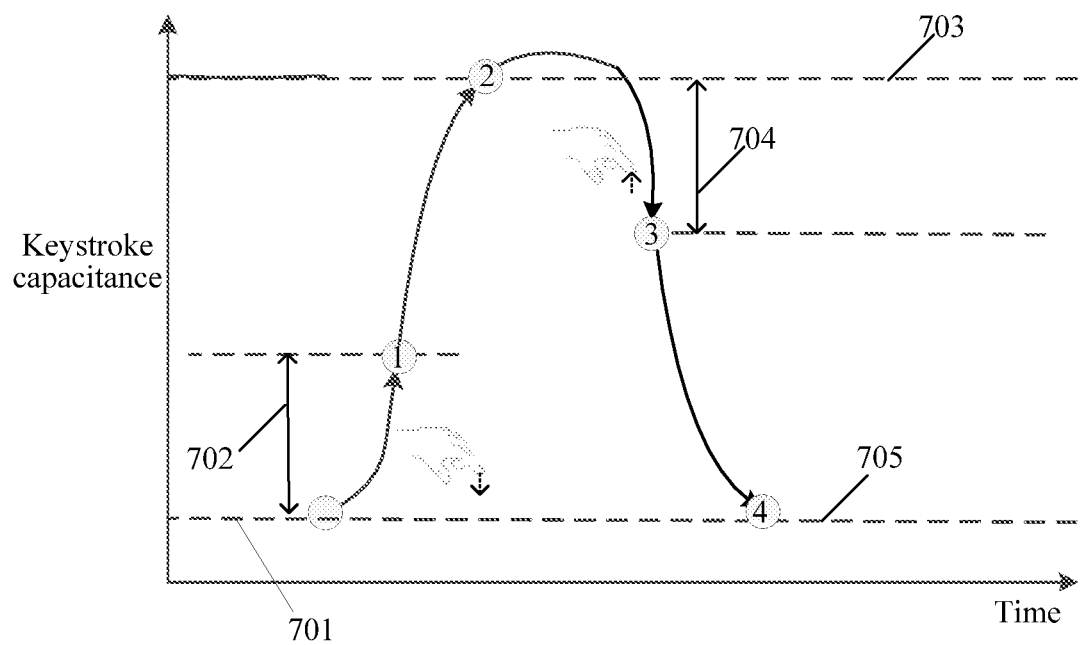
FIG. 7 is a schematic diagram of a process of pressing and loosening a key in a case where a capacitance value increases as the key is pressed according to a second embodiment of the present disclosure.

Moreover, this embodiment can be applied to a case where a finger presses a key and a pressing capacitance value gradually increases. A process of pressing and loosening the key in the case is specifically described below, and a schematic diagram of the process is shown in FIG. 7.

When no finger presses, a pressing reference is at a smallest value 701, and a pressing threshold 702 and a release threshold 704 are preset. When a difference between the pressing reference and the pressing capacitance value exceeds the pressing threshold 702 of the keystroke chip after a finger presses, the keystroke chip triggers a pressing interrupt and sends the pressing interrupt to the main control chip (that is, "1" marked in the figure). Subsequently, the finger continues to press, and when the finger completely presses (that is, "2" marked in the figure), a largest pressing capacitance obtained in this pressing process is used as a release reference 703. After the finger gradually leaves the keystroke chip, the capacitance value of the keystroke chip gradually decreases. When a sum of a current release capacitance value and the release reference is equal to or less than the release threshold 704, a release interrupt (that is, "3" marked in the figure) is triggered, and the keystroke chip sends the release interrupt to the main control chip. The finger continues to loosen the key, and when the key is approximately in a normal state (that is, "4" marked in the figure), a smallest release capacitance value obtained in this process is used as a pressing reference 705. After the finger completely leaves the key, the reference value of the key returns to a lowest point 705 again. The lowest point 705 may be different from the smallest pressing reference value 701.

Figure 8:
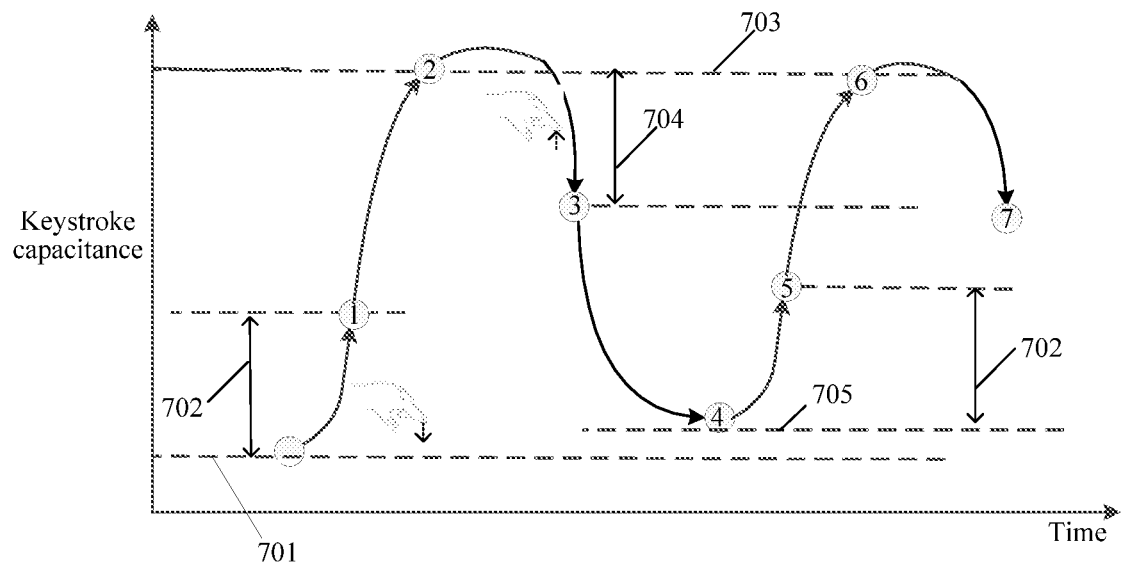
FIG. 8 is a schematic diagram of a process of pressing and loosening a key in a case where a capacitance value increases as the key is pressed and when an external environment changes according to a second embodiment of the present disclosure.

When an external environment changes in a case where a finger presses a key and a pressing capacitance value gradually increases, FIG. 8 is a schematic diagram of a process of pressing and loosening the key.

When a temperature of the external environment changes, the key has an offset, and a method in this embodiment can be used for an impact from the environment temperature. For example, when the temperature increases (or decreases), a pressing reference increases from a lowest point 701 to a higher point 705. In this case, a user may update the pressing reference to the correct pressing reference 705 in a pressing process, and detect a changing pressing threshold 702 to trigger a pressing interrupt (that is, "5" marked in the figure) of the key and a release interrupt (that is, "7" marked in the figure) after the pressing interrupt.

A main technical effect of this embodiment of the present disclosure is described. After a pressing interrupt is received, a plurality of pressing capacitance values after the pressing interrupt is obtained. A new release reference of the keystroke chip is set according to one of the plurality of pressing capacitance values, and different keystroke chips may set release references for a next stage according to the pressing capacitance values obtained after a key is pressed. Consequently, this can be applied to the different keystroke chips, and high consistency in various parameters of the keystroke chips is not required, and interchangeability is high. Each time after a pressing interrupt occurs, the release reference is dynamically updated, and the release reference is set according to a current state, which allows a reference moment of the release reference to be consistent with an external environment. Therefore, interference from the external environment can be avoided or reduced, and anti-interference is stronger. Moreover, only after an interrupt occurs, the reference is updated. Such an update is performed by using a time gap of a terminal device, and can avoid wasting resources of a main control chip.

A third embodiment of the present disclosure relates to a method for updating a keystroke reference. The third embodiment and the first embodiment are substantially the same and mainly differ in that in the third embodiment of the present disclosure the keystroke chip can automatically report an error, and reset the pressing reference according to the normal capacitance value. The resetting on the pressing reference can prevent a key pressing state from being determined erroneously when the reference is set in error.

In this embodiment, if, with the setting of a new pressing reference, the finger does not press, if in a case a detected normal capacitance value as a pressing reference value is different from the set pressing reference value, it is determined accordingly that the pressing reference value is set in error. When detecting that the pressing reference value is in error, the keystroke chip automatically reports a pressing reference error interrupt. The main control chip obtains the normal capacitance value from the keystroke chip, and sets the normal capacitance value as the pressing reference value.

The pressing reference error interrupt may occur at any moment. The pressing reference error interrupt has a highest priority, and when receiving the pressing reference error interrupt, the main control chip preferentially processes a problem of the pressing reference error interrupt.

A main effect of this embodiment of the present disclosure is described. When receiving a reference error interrupt sent by the keystroke chip, the keystroke chip can automatically report an error, and reset the pressing reference according to the normal capacitance value. The resetting on the pressing reference can prevent a key pressing state from being determined erroneously due to the reference in error.

Division of the steps of the above various methods is only for the ease of clear description. During implementation, the steps may be combined into one step or some steps are divided into a plurality of steps. All shall fall within the protection scope of this application, as long as the same logical relationship is included. Insignificant modification added to or insignificant designs introduced in an algorithm or a process without changing the core of the algorithm or process shall fall within the protection scope of the application.

Figure 9:
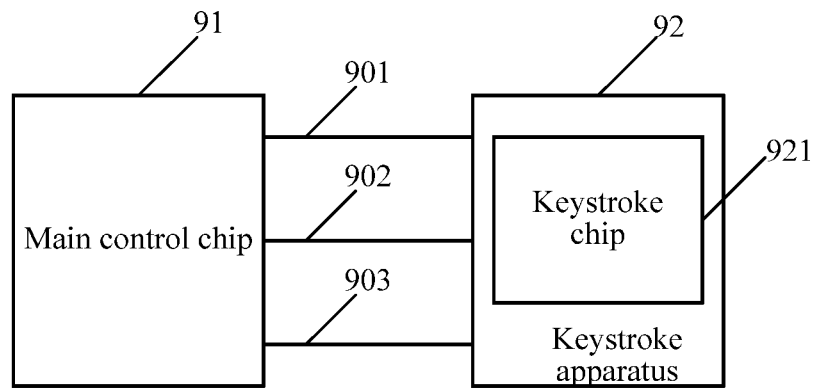
FIG. 9 is a schematic diagram of a keystroke reference update module according to a fourth embodiment of the present disclosure.

A fourth embodiment of the present disclosure relates to a module for updating a keystroke reference. As shown in FIG. 9, the module includes: a main control chip 91, and a keystroke apparatus 92 including a keystroke chip 921.

When a finger presses the keystroke apparatus 92, the keystroke chip 921 is configured to generate a pressing interrupt and send the pressing interrupt to the main control chip 91.

The main control chip 91 is configured to receive the pressing interrupt, and obtain a plurality of pressing capacitance values from the keystroke chip 921, where the plurality of pressing capacitance values include a capacitance value of the keystroke chip 921 at a generation moment of the pressing interrupt and a capacitance value of the keystroke chip 921 at a scanning moment next to the generation moment of the pressing interrupt.

The main control chip 91 is further configured to set a release reference of the keystroke chip 921 according to the plurality of pressing capacitance values.

A main improvement and effect of this embodiment of the present disclosure are described. After a pressing interrupt is received, a plurality of pressing capacitance values are then obtained. A new release reference of the keystroke chip is set according to one of the plurality of pressing capacitance values, and different keystroke chips may set release references for a next stage according to the capacitance values obtained from the current pressing. Therefore, this can be applied to the different keystroke chips, and high consistency in various parameters of different keystroke chips is not required, and interchangeability is high. Each time after a pressing interrupt occurs, the release reference is dynamically updated, and the release reference is set according to a current state, which allows the release reference at a moment to be consistent with an external environment. Therefore, interference from the external environment can be reduced, and anti-interference is stronger. Moreover, only after an interrupt occurs, the reference is updated. Such an update is performed by using a time gap of a terminal device, and can avoid wasting resources of a main control chip.

It is not difficult to find that, this embodiment is a system embodiment corresponding to the first embodiment, and this embodiment and the first embodiment may be implemented in cooperation with each other. Related technical details mentioned in the first embodiment are still effective in this embodiment, and to reduce repetition, details are not described herein again. Correspondingly, related technical details mentioned in this embodiment may also be applied to the first embodiment.

A fifth embodiment of the present disclosure relates to a module for updating a keystroke reference. In the fifth embodiment, further improvements have been made to the fourth embodiment, and the main improvements are described. In the fifth embodiment, for a pressing process and a release process, a pressing reference and a release reference are respectively set for the keystroke chip, so that the keystroke chip has different determining references for pressing and release, and the determining is more accurate; and the pressing reference and the release reference are updated in a similar manner, which further improves anti-interference of a keystroke chip, and prevents the keystroke chip from being susceptible to an external environment.

Specifically, the main control chip 91 sets a function, a reference, and a threshold for the keystroke chip 921 by using a communication line 901. On the contrary, when detecting that a condition set by the main control chip 91 is satisfied, the keystroke chip 921 notifies the main control chip 91 by using an interrupt line 902. Moreover, the main control chip 91 may further provide power for the keystroke apparatus 92 by using a power line 903.

More specifically, when a finger presses the keystroke apparatus 92, the keystroke chip 921 is configured to generate a pressing interrupt and send the pressing interrupt to the main control chip 91 by using the interrupt line 902. The main control chip 91 is configured to receive the pressing interrupt, and obtain a plurality of pressing capacitance values from the keystroke chip 921. The plurality of pressing capacitance values include a capacitance value of the keystroke chip 921 at a generation moment of the pressing interrupt and a capacitance value of the keystroke chip 921 at a scanning moment next to the generation moment of the pressing interrupt. The main control chip 91 is further configured to set a release reference of the keystroke chip 921 according to the plurality of pressing capacitance values.

Moreover, when the finger releases from the keystroke apparatus 92, the keystroke chip 921 is further configured to generate a release interrupt and send the release interrupt to the main control chip 91. The main control chip 91 is further configured to receive the release interrupt, and obtain a plurality of release capacitance values from the keystroke chip 921. The plurality of release capacitance values include a capacitance value of the keystroke chip 921 at a generation moment of the release interrupt and a capacitance value of the keystroke chip 921 at a scanning moment next to the generation moment of the release interrupt. The main control chip 91 is further configured to set a pressing reference of the keystroke chip 91 according to the plurality of release capacitance values.

The release interrupt is generated by the keystroke chip 921 according to the release reference and a release threshold, and the pressing interrupt is generated by the keystroke chip 921 according to the pressing reference and a pressing threshold.

Further, the main control chip 91 is configured to set a pressing capacitance value that meets a first preset condition from the plurality of pressing capacitance values as the release reference of the keystroke chip 921, and set a release capacitance value that meets a second preset condition from the plurality of release capacitance value as the pressing reference of the keystroke chip 921.

The first preset condition is a smaller capacitance value of the plurality of capacitance values, and the second preset condition is a larger capacitance value of the plurality of capacitance values. Alternatively, the first preset condition is a larger capacitance value of the plurality of capacitance values, and the second preset condition is a smaller capacitance value of the plurality of capacitance values. In the above two cases, achieved final effects are the same.

Moreover, after receiving the pressing interrupt, and before obtaining the plurality of pressing capacitance values from the keystroke chip 921, the main control chip 91 enters an operating state from a sleep state. If the main control chip 91 is in the operating state before receiving the pressing interrupt, the main control chip 91 directly performs the following operation.

In practice, the keystroke apparatus 92 may be a fingerprint recognition apparatus, and the keystroke chip 921 may be a fingerprint chip. The fingerprint chip may recognize user information while detecting a key pressing state.

A main improvement and effect of this embodiment of the present disclosure are described. After a pressing interrupt is received, a plurality of pressing capacitance values are then obtained. A new release reference of the keystroke chip is set according to one of the plurality of pressing capacitance values, and different keystroke chips may set release references for a next stage according to the capacitance values obtained from the current pressing. Therefore, this can be applied to the different keystroke chips, and high consistency in various parameters of different keystroke chips is not required, and interchangeability is high. Each time after a pressing interrupt occurs, the release reference is dynamically updated, and the release reference is set according to a current state, which allows the release reference at a moment to be consistent with an external environment. Therefore, interference from the external environment can be reduced, and anti-interference is stronger. Moreover, only after an interrupt occurs, the reference is updated. Such an update is performed by using a time gap of a terminal device, and can avoid wasting resources of a main control chip.

It is not difficult to find that, this embodiment is a system embodiment corresponding to the second embodiment, and this embodiment and the second embodiment may be implemented in cooperation with each other. Related technical details mentioned in the second embodiment are still effective in this embodiment, and to reduce repetition, details are not described herein again. Correspondingly, related technical details mentioned in this embodiment may also be applied to the second embodiment.

A sixth embodiment of the present disclosure relates to a key reference update module. The fifth embodiment and the fourth embodiment are substantially the same, and are mainly differ in that, in the fifth embodiment of the present disclosure, when a reference error interrupt sent by the keystroke chip is received, a pressing reference may be reset according to a normal capacitance value. The resetting on the pressing reference can prevent a key pressing state from being determined erroneously due to the reference in error.

The keystroke chip 921 is further configured to generate a pressing reference error interrupt and send the pressing reference error interrupt to the main control chip.

The main control chip 91 is configured to receive the pressing reference error interrupt, and obtain the normal capacitance value from the keystroke chip 921. The normal capacitance value is a capacitance value of the keystroke chip 921 in a state of being not pressed.

The main control chip 91 is further configured to set the pressing reference according to the normal capacitance value.

A main improvement and effect of this embodiment of the present disclosure are described. When the reference error interrupt sent by the keystroke chip is received, the pressing reference may be reset according to the normal capacitance value. The resetting on the pressing reference may prevent a key pressing state from being determined erroneously due to the reference in error.

Because the third embodiment and this embodiment correspond to each other, this embodiment and the third embodiment may be implemented in cooperation with each other. Related technical details mentioned in the third embodiment are still effective in this embodiment, the technical effect that can be achieved in the third embodiment may also be achieved in this embodiment likewise, and to reduce repetition, details are not described herein again. Correspondingly, related technical details mentioned in this embodiment may also be applied to the third embodiment.

A seventh embodiment of the present disclosure relates to a terminal device. The terminal device includes a module for updating a keystroke reference in the fourth embodiment or fifth embodiment.

Figure 10:
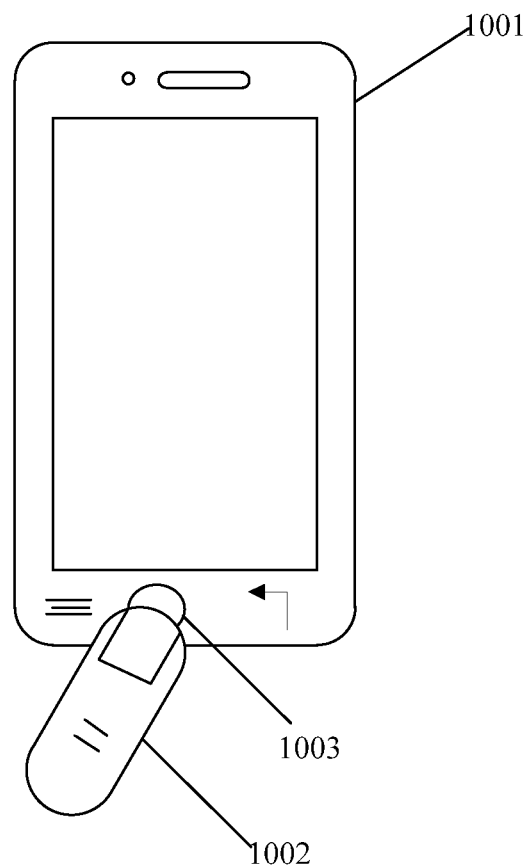
FIG. 10 is a schematic structural diagram of a terminal device according to a seventh embodiment of the present disclosure.

The terminal device may be an electronic device such as a smartphone, a tablet computer, or a smartwatch. As shown in FIG. 10, FIG. 10 is a schematic diagram of an overall view of the terminal device: a mobile phone 1001. A finger 1002 presses a key 1003. The mobile phone 1001 performs a current corresponding operation when detecting that the key 1003 is pressed. Moreover, the module for updating a keystroke reference is integrated in the key 1003, so that a keystroke reference is updated at an interrupt interval. Therefore, determining a key pressing state is not susceptible to an external environment.

A main improvement and effect of this embodiment of the present disclosure are described. The module for updating a keystroke reference is integrated in the terminal device. After receiving a pressing interrupt, a keystroke chip obtains a plurality of pressing capacitance values after the pressing interrupt, and sets a new release reference of the keystroke chip according to one of the plurality of pressing capacitance values. And different keystroke chips may set release references for a next stage according to the capacitance values obtained from the current pressing. Therefore this can be applied t to the different keystroke chips, and high consistency in various parameters of the keystroke chips is not required, and interchangeability is high. Each time after a pressing interrupt occurs, the release reference is dynamically updated, and the release reference is set according to a current state, which allows the release reference at a moment to be consistent with an external environment. Therefore, interference from the external environment can be reduced, and anti-interference is stronger. Moreover, only after an interrupt occurs, the reference is updated. Such an update is performed by using a time gap of the terminal device, and can avoid wasting resources of a main control chip.

A person of ordinary skill in the art can understand that, the above embodiments are specific examples for implementing the present disclosure, and in practice, various changes may be made to the forms and details of the examples without departing from the spirit and scope of the present disclosure.

What is claimed is:

1. A method for updating a keystroke reference, comprising:
receiving a pressing interrupt sent by a keystroke chip;
obtaining a plurality of pressing capacitance values from the keystroke chip, wherein the plurality of pressing capacitance values include a capacitance value of the keystroke chip at a generation moment of the pressing interrupt and a capacitance value of the keystroke chip at a scanning moment next to the generation moment of the pressing interrupt; and
setting a release reference of the keystroke chip according to the plurality of pressing capacitance values;
the method further comprising:
receiving a pressing reference error interrupt sent by the keystroke chip;
obtaining a normal capacitance value from the keystroke chip, wherein the normal capacitance value is a capacitance value of the keystroke chip when not pressed; and
setting the pressing reference according to the normal capacitance value.

2. The method according to claim 1, further comprising:
receiving a release interrupt sent by the keystroke chip;
obtaining a plurality of release capacitance values from the keystroke chip, wherein the plurality of release capacitance values comprise a capacitance value of the keystroke chip at a generation moment of the release interrupt and a capacitance value of the keystroke chip at a scanning moment next to the generation moment of the release interrupt; and
setting a pressing reference of the keystroke chip according to the plurality of release capacitance values.

3. The method according to claim 2, wherein:
the setting a release reference of the keystroke chip according to the plurality of pressing capacitance values comprises: setting a pressing capacitance value that meets a first preset condition from the plurality of pressing capacitance values as the release reference of the keystroke chip; and
the setting a pressing reference of the keystroke chip according to the plurality of release capacitance values comprises: setting a release capacitance value that meets a second preset condition from the plurality of release capacitance value as the pressing reference of the keystroke chip.

4. The method according to claim 3, wherein:
the first preset condition is a smallest pressing capacitance value of the plurality of pressing capacitance values, and the second preset condition is a largest release capacitance value of the plurality of release capacitance values.

5. The method according to claim 3, wherein:
the first preset condition is a largest pressing capacitance value of the plurality of pressing capacitance values, and the second preset condition is a smallest release capacitance value of the plurality of release capacitance values.

6. The method according to claim 2, wherein the release interrupt is generated by the keystroke chip according to the release reference and a release threshold, and the pressing interrupt is generated by the keystroke chip according to the pressing reference and a pressing threshold.

7. A module for updating a keystroke reference, comprising: a main control chip and a keystroke apparatus comprising a keystroke chip, wherein
the keystroke chip is configured to generate a pressing interrupt and send the pressing interrupt to the main control chip when a finger presses the keystroke apparatus;
the main control chip is configured to receive the pressing interrupt, and obtain a plurality of pressing capacitance values from the keystroke chip, wherein the plurality of pressing capacitance values comprise a capacitance value of the keystroke chip at a generation moment of the pressing interrupt and a capacitance value of the keystroke chip at a scanning moment next to the generation moment of the pressing interrupt; and the main control chip is further configured to set a release reference of the keystroke chip according to the plurality of pressing capacitance values;

wherein the keystroke chip is further configured to generate a pressing reference error interrupt and send the pressing reference error interrupt to the main control chip;

the main control chip is configured to receive the pressing reference error interrupt, and obtain a normal capacitance value from the keystroke chip, wherein the normal capacitance value is a capacitance value of the keystroke chip in a state of being not pressed; and the main control chip is further configured to set the pressing reference according to the normal capacitance value.

8. The module according to claim 7, wherein:

the keystroke chip is further configured to generate a release interrupt and send the release interrupt to the main control chip when the finger releases from the keystroke apparatus;

the main control chip is further configured to receive the release interrupt, and obtain a plurality of release capacitance values from the keystroke chip, wherein the plurality of release capacitance values comprise a capacitance value of the keystroke chip at a generation moment of the release interrupt and a capacitance value of the keystroke chip at a scanning moment next to the generation moment of the release interrupt; and the main control chip is further configured to set a pressing reference of the keystroke chip according to the plurality of release capacitance values.

9. The module according to claim 8, wherein the main control chip is configured to set a pressing capacitance value that meets a first preset condition from the plurality of pressing capacitance values as the release reference of the keystroke chip, and set a release capacitance value that meets a second preset condition from the plurality of release capacitance value as the pressing reference of the keystroke chip.

10. The module according to claim 9, wherein:

the first preset condition is a smallest pressing capacitance value of the plurality of pressing capacitance values, and the second preset condition is a largest release capacitance value of the plurality of release capacitance values.

11. The module according to claim 9, wherein:

the first preset condition is a largest pressing capacitance value of the plurality of pressing capacitance values, and the second preset condition is a smallest release capacitance value of the plurality of release capacitance values.

12. The module according to claim 8, wherein the release interrupt is generated by the keystroke chip according to the release reference and a release threshold, and the pressing interrupt is generated by the keystroke chip according to the pressing reference and a pressing threshold.

13. The module according to claim 7, wherein the main control chip enters into an operation state from a sleep state after the main control chip receives the pressing interrupt and before the main control chip receives the plurality of pressing capacitance values from the keystroke chip.

14. The module according to claim 7, wherein the keystroke apparatus is a fingerprint recognition apparatus, and the keystroke chip is a fingerprint chip.

15. A terminal device, comprising: a module for updating a keystroke reference; the module comprising: a main control chip and a keystroke apparatus comprising a keystroke chip, wherein;

the keystroke chip is configured to generate a pressing interrupt and send the pressing interrupt to the main control chip when a finger presses the keystroke apparatus;

the main control chip is configured to receive the pressing interrupt, and obtain a plurality of pressing capacitance values from the keystroke chip, wherein the plurality of pressing capacitance values comprise a capacitance value of the keystroke chip at a generation moment of the pressing interrupt and a capacitance value of the keystroke chip at a scanning moment next to the generation moment of the pressing interrupt; and the main control chip is further configured to set a release reference of the keystroke chip according to the plurality of pressing capacitance values;

wherein the keystroke chip is further configured to generate a pressing reference error interrupt and send the pressing reference error interrupt to the main control chip;

the main control chip is configured to receive the pressing reference error interrupt, and obtain a normal capacitance value from the keystroke chip, wherein the normal capacitance value is a capacitance value of the keystroke chip in a state of being not pressed; and the main control chip is further configured to set the pressing reference according to the normal capacitance value.

16. The terminal device according to claim 15, wherein:

the keystroke chip is further configured to generate a release interrupt and send the release interrupt to the main control chip when the finger releases from the keystroke apparatus;

the main control chip is further configured to receive the release interrupt, and obtain a plurality of release capacitance values from the keystroke chip, wherein the plurality of release capacitance values comprise a capacitance value of the keystroke chip at a generation moment of the release interrupt and a capacitance value of the keystroke chip at a scanning moment next to the generation moment of the release interrupt; and the main control chip is further configured to set a pressing reference of the keystroke chip according to the plurality of release capacitance values.

17. The terminal device according to claim 16, wherein the main control chip is configured to set a pressing capacitance value that meets a first preset condition from the plurality of pressing capacitance values as the release reference of the keystroke chip, and set a release capacitance value that meets a second preset condition from the plurality of release capacitance value as the pressing reference of the keystroke chip.

18. The terminal device according to claim 16, wherein:

the first preset condition is a smallest pressing capacitance value of the plurality of pressing capacitance values, and the second preset condition is a largest release capacitance value of the plurality of release capacitance values; or the first preset condition is a largest pressing capacitance value of the plurality of pressing capacitance values, and the second preset condition is a smallest release capacitance value of the plurality of release capacitance values.

* * * * *